United States Patent [19]
Sestak

[11] Patent Number: 5,999,592
[45] Date of Patent: Dec. 7, 1999

[54] NETWORK NODE EVENT NOTIFICATION IN CIRCUIT SWITCHED ENVIRONMENTS

[75] Inventor: Mark R. Sestak, Ottawa, Canada

[73] Assignee: Mitel Corporation, Ontario, Canada

[21] Appl. No.: 08/119,980

[22] Filed: Sep. 10, 1993

[30] Foreign Application Priority Data

Sep. 11, 1992 [CA] Canada ................................ 2078081

[51] Int. Cl.⁶ ............................................. H04M 11/04
[52] U.S. Cl. .............................................. 379/14; 379/29
[58] Field of Search ............................... 379/9, 12, 14, 379/15, 29, 33, 34, 49, 97

[56] References Cited

U.S. PATENT DOCUMENTS

| | | | |
|---|---|---|---|
| 4,464,543 | 8/1984 | Kline et al. | 379/14 |
| 4,656,319 | 4/1987 | Bially | 379/29 |
| 4,837,811 | 6/1989 | Burtler | 379/97 |
| 5,049,873 | 9/1991 | Robins et al. | 379/14 |

FOREIGN PATENT DOCUMENTS

| | | | |
|---|---|---|---|
| 0 279 355 A2 | 11/1988 | European Pat. Off. | H04Q 11/04 |
| 0013054 | 6/1988 | Japan | 379/14 |
| 63-189040 | 8/1988 | Japan | 379/32 |
| 2-13054 | 1/1990 | Japan | 379/14 |
| 2254522 | 7/1992 | United Kingdom | H04M 3/36 |

*Primary Examiner*—Stephen Chin
*Attorney, Agent, or Firm*—Charles E. Wands

[57] ABSTRACT

A method of reporting an event to a monitoring station in a network of communication switching exchanges comprised of monitoring in each exchange for events to be reported, upon detection of the event, the exchange in which the event occurred automatically dialing a gateway network node to which a network monitoring station is connected, upon the network node responding to the automatic dialing, sending at least one DTMF signal containing a report of the nature of the event and an identification of the exchange in which the event occurred to the network node for provision to the network monitoring station.

2 Claims, 2 Drawing Sheets

5,999,592

NETWORK NODE EVENT NOTIFICATION IN CIRCUIT SWITCHED ENVIRONMENTS

FIELD OF THE INVENTION

This invention relates to communication switching system networks and in particular to a method of implementing fault reporting therein.

BACKGROUND TO THE INVENTION

One of the functions of switching system network management is to provide the capability of central alarm monitoring for all of the switching exchanges connected in the network. Ideally this would provide real time or near real time notification of alarm conditions occurring in each switching system to a central monitoring station. It should also provide accurate indication of what the alarm is, and not to consume excessive trunking resources.

Central alarm monitoring has generally been solved in one of four ways.

Using a packet switching backbone network, the nodes (switching machines) of the network are interconnected thereby to a central alarm monitoring system. When an alarm transition is detected by a network node, the node sends an information packet addressed to the central monitoring system via the backbone. The packet switching backbone assures that the information packet reaches its desired destination.

However this approach is expensive for those networks which are not already equipped with packet switching capability, e.g. circuit switched networks which only handle voice traffic or circuit switched data calls.

A second system uses polling without dedicated circuit switched links. In this case, a central monitoring system continuously polls each node in the network to collect alarm status information. The current information is compared against the previous, and if not equivalent, the monitoring system considers that an alarm transition has occurred. After collecting information from one or from N nodes, (N nodes may be polled simultaneously, depending on the configuration of the polling system), the next one or N nodes is polled. When N equals the number of nodes in the network, the third type of system described below exists.

This approach has two major deficiencies. In order to meet the requirement of real time or near real time performance, polling must occur frequently. It utilizes valuable trunk circuitry each time polling occurs. Also, depending on the number of network nodes being monitored and the number of nodes that can be polled simultaneously, this solution may not be able to provide real time or near real time performance requirements.

A third approach uses polling with "nailed-up" (dedicated) circuit switched links. In this approach, the central monitoring system has a dedicated circuit switch connection to each node in the network. Periodically, current alarm information is compared against the previous and, if not equivalent, the monitoring system considers that an alarm transition has occurred.

This approach monopolizes valuable trunk circuitry without properly utilizing the bandwidth. Depending on the number of nodes being monitored, the cost of the trunk circuitry may be prohibitive.

In a fourth approach, there is automatic dial-back occurring with switch contact closures. In this approach, the network nodes are hard-wired to additional hardware. When certain hard-wired conditions occur, the attached hardware dials a remote location to report the hard-wired condition.

This approach has two major deficiencies. It requires additional hardware in the network, thereby increasing cost of the solution and the number of hardware components that might fail. It also does not provide adequate resolution for alarm conditions which can occur within a complex network node since it is not an integrated solution. For instance, it may be able to detect and signal that the node has experienced a power outage, but would not be able to detect and signal that e.g. 20% of the trunking resource has been taken out of service, unless this condition was associated with a contact closure, which would be unlikely.

SUMMARY OF THE INVENTION

In accordance with the present invention, real time or near real time notification of alarm transitions are provided from the network nodes to the monitoring station. An accurate indication of what the alarm is also provided to the monitoring station. Dedicated trunks are not required, and excessive trunk resource is not consumed. Further, special hardware other than main processor memory of each node in the network is not required.

In accordance with an embodiment of the invention, a method of reporting an event to a monitoring station in a network of communication switching exchanges is comprised of monitoring in each exchange for events to be reported; upon detection of the event the exchange in which the event occurred automatically dialing a gateway network node to which a network monitoring station is connected, upon the network node responding to the automatic dialing, sending at least one DTMF signal containing a report of the nature of the event and an identification of the exchange in which the event occurred to the network node for provision to the network monitoring station.

BRIEF INTRODUCTION TO THE DRAWINGS

A better understanding of the invention will be obtained by reference to the detailed description below, in conjunction with the following drawings, in which.

DETAILED DESCRIPTION OF THE INVENTION

Figure 1:
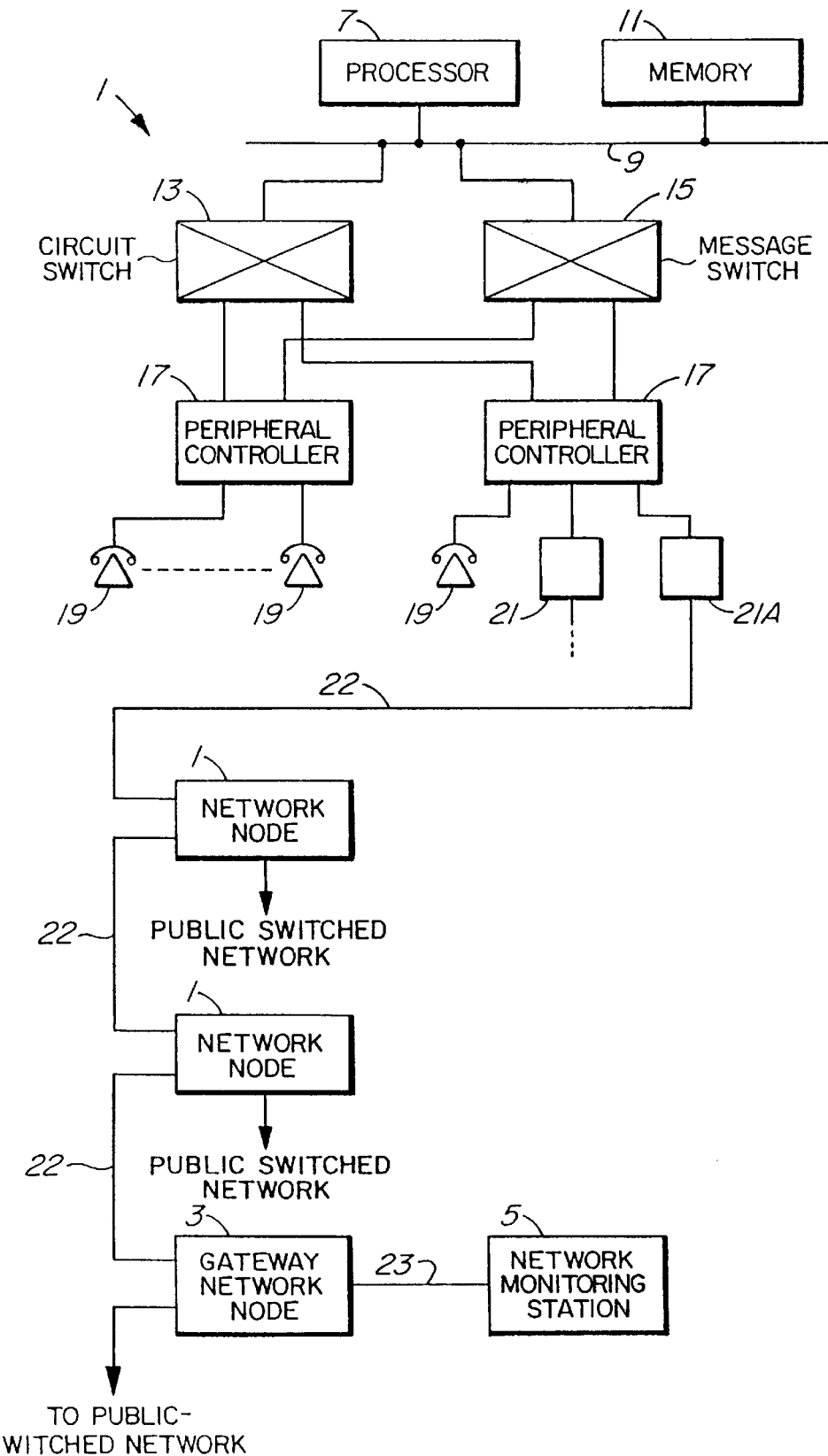
FIG. 1 is a block diagram of a network for implementing this invention.

Turning to FIG. 1, a network of communication exchanges, each being referred to below as network node 1, are connected to a gateway network node 3, which can be connected to the public switched network. A network monitoring station 5 for the local network of communication switching exchanges is connected to gateway network node 3. Each network node can be, for example, the type SX2000™ telephone switching system which is sold by Mitel Corporation. Such a system is described in U.S. Pat. No. 4,615,028 issued Sep. 30, 1986 and U.S. Pat. No. 4,616,360 issued Oct. 7, 1986 and assigned to Mitel Corporation.

A basic block diagram of this type of system is shown in FIG. 1, and is comprised of a main system processor 7 connected to bus 9 and memory 11 connected to bus 9 for storage of operating programs and data for controlling processor 7. A circuit switch 13 and a message switch 15 are connected to bus 9. Peripheral controllers 17 have various peripherals, such as telephones 19 and trunks 21, one of the latter labelled 21A being connected to another network node. Thus all or a subset of the network nodes and gateway nodes form for example a private switched network.

As described in the aforenoted patents, calls are switched via circuit switch 13, traversing peripheral controllers 17. The message switch 15 switches control information between peripheral controllers and processor 7 or from processor 7 out via a trunk 21 or 21A to another network node.

In accordance with the present invention, all network nodes 1 are capable of initiating normal circuit switched calls, dialing DTMF digits and detecting specific tones, including voice and dial tone, via tone detection hardware in the system and software programs stored in the memory or in memories associated with the peripheral controllers 17. This function is described in the aforenoted patents and elsewhere.

The gateway network node 3 is capable of terminating circuit switched calls and waiting for additional DTMF digits. This is also a well known function of "auto-attendant" or DISA (Direct Inward System Access).

Each network node is connected to the gateway network node via a normal data communications link 22 which supports a common proprietary or non-proprietary communication protocol which allows the exchange of information between the gateway network node and the network node. In simpler terms, data can be communicated by the processor 7 and message switch 15 out through trunk 21A in a manner as described in the aforenoted patents, and addressed to a specific dialed-up address (line) in the gateway network node 3. The particular data protocol used for communication between processor 7 and the corresponding processor in gateway 3 must of course be understood by both.

When an alarm transition occurs in a network node (e.g. the alarm status for a node changes from minor to major) the network node initiates a circuit switched call via an analog or digital trunk communication link 22 to the dialed answering point (DISA or auto-attendant) on the gateway network node. The routing of such a call is based on standard programming of the network. When the call is answered by the gateway network node, the network node provides additional DTMF digits to indicate the identity of the network node reporting the alarm, the current alarm status, etc.

The additional DTMF digits are routed to the network monitoring station 5 through the data communication link 23. The network monitoring station thus takes appropriate action based on the received digits.

It is preferred that the data communication link should be dedicated to this function.

Figure 2:
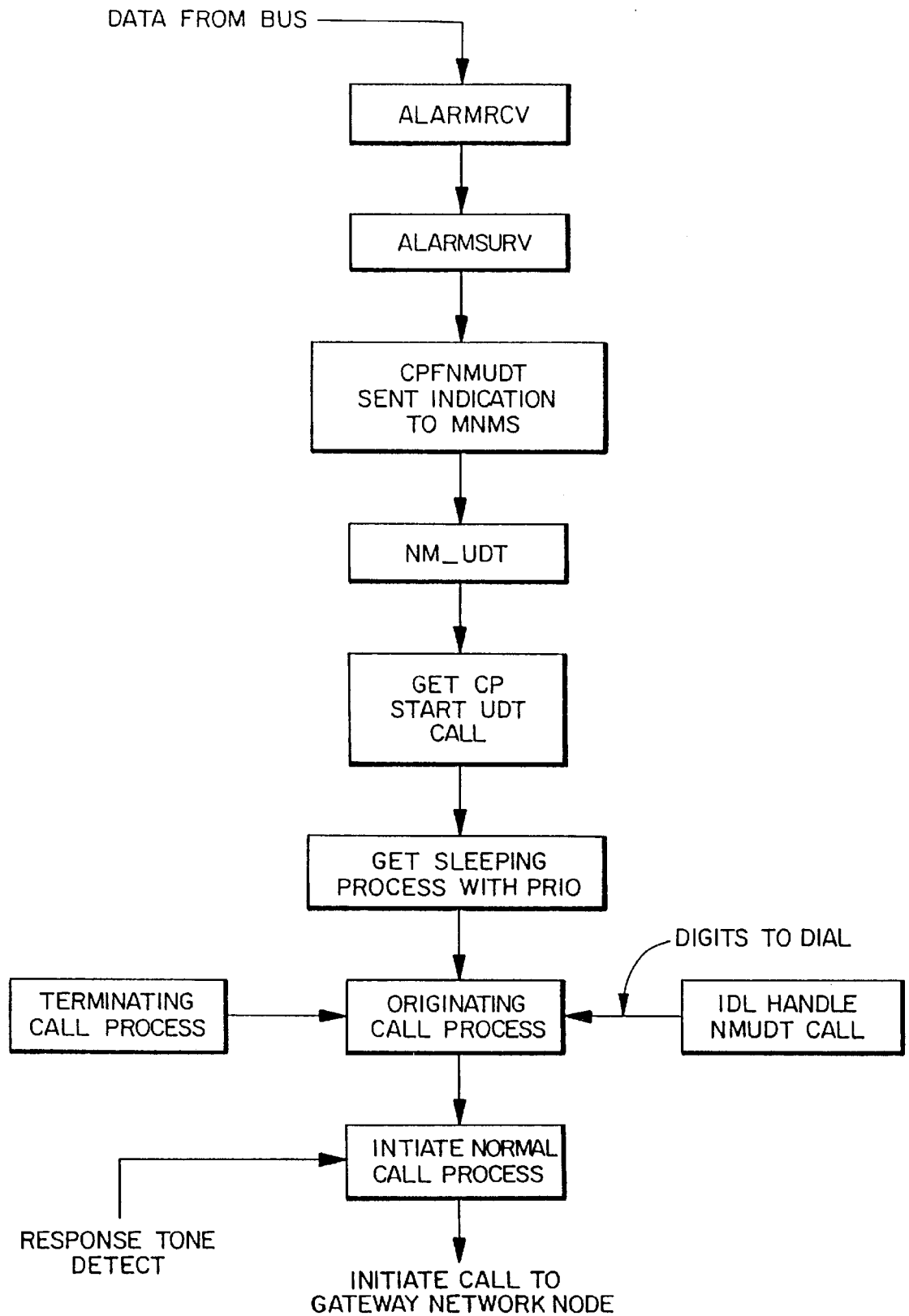
FIG. 2 is a flow chart illustrating particular process steps for implementing the present invention.

A description of operation in detail will now be given with respect to FIG. 2. The various steps in the process will be given specialized names, and may be implemented using subroutines stored in memory 11, which subroutines may be considered as having the same names as the steps to be described below.

Under a subroutine "alarmrcv" used by processor 7, the alarm conditions of the system 1 are monitored by the processor 7. Since under normal conditions the processor 7 checks elements and the subsystems of the system, upon an indication of a failure, the processor 7 processes the condition data.

When "alarmrcv" completes its evaluation of the alarm condition of the system, a message is sent to the "alarmsurv" subroutine. "Alarmsurv" compares the current alarm's condition with the previous alarm's condition and notes any transitions that have occurred. If an alarm condition has occurred, the "alarmsurv" subroutine calls another subroutine called "cpfnmudt_send_indication_to_mnms" to initiate an unsolicited data transfer procedure. As part of the parameters to this subroutine, "alarmsurv" passes both the highest alarm level currently being experienced on the switch, and an indication that this unsolicited data notification is coming from the alarms management routine.

The "cpfnmudt_send_indication_to_mnms" subroutine then sends a message to the "nm_udt" subroutine. Contained within this message is data to indicate the highest alarm level apparently being experienced on the switch and an indication that this unsolicited event notification is coming from the alarm management subroutine. Upon receiving this message, "nm_udt" calls a subroutine called "get_cp_start_udt_call" and as part of the calling parameters passes in an indication that this is an unsolicited event notification call.

"Get_cp_start_udt_call" invokes a subroutine "get_sleeping_process_with_prio". This subroutine allocates an originating call procedure (the procedure which controls the origination of a call) from the pool of available call originating procedures. Upon the successful allocation of a call initiation procedure, the routine sends a message "mnms_udt_call" to the call procedure which contains the information received in the input message.

Based on the received message, the originating call procedure knows that it must convey information to the gateway network node. As a result, it retrieves the digits to call on the outgoing call to the gateway network node previously stored in memory 11 via the subroutine "idl_handle_NMUDT_call". These digits are programmable by the customer, and signify what must be dialed to reach the DISA or auto-attendant number on the gateway network node.

The digits to dial information is that which is required by the originating call initiation subroutine in order to initiate a normal call processing sequence in processor 7. As a result the originating call procedure allocates a terminating call procedure to handle the termination portion of the call on the network node. The terminating call procedure handles signals received, such as dial tone, from the terminating device i.e. the gateway network node. As part of this allocation the originating procedure informs the terminating procedure that this is an unsolicited data transfer (UDT) call and transfers to it the digits to dial.

The terminating call subroutine follows the standard call processing procedure and outputs the data to the trunk 21A via message switch 15 and peripheral controller 17 to generate (dial) the digits. The routing of the call follows the network programming within the network node (PBX). Eventually the call arrives at the gateway network node 3 and terminates on either a DISA answering point or the auto-attendant.

Because this was a UDT call, the terminating process on the network node understands that it must detect dial tone (DISA number) or voice (auto-attendant) prior to transmitting the alarm information to the gateway network node. To accomplish this, the terminating call subroutine utilizes the tone detection capability which already exists within a network node such as the SX2000™ system. The tone detection system is advised to inform the call subroutine when either dial tone or voice is detected.

Once the tone or voice is detected, the terminating call procedure sends a message "mnms_indication_request" to the "nm_udt" subroutine. In response, the "nm_udt" subroutine sends the "mnms_indication_reply" message back to the terminating call subroutine which contains the information which the network node wishes to convey to the gateway node.

Via DTMF, the terminating call subroutine transmits this information to the DISA or auto-attendant answering point on the gateway network node 3. Based on the digits received at the gateway network node, the gateway network node recognizes that this is destined for the network monitoring station. The gateway network node passes this information on to the network monitoring station 5 via the previously established dedicated link. Upon receipt of the information via the dedicated link between the gateway network node and the network monitoring station, the network monitoring station takes the necessary action, such as ringing an alarm bell and displaying the data on a display screen.

It should be noted that the gateway network node and the network monitoring station could be operated by a single processor.

It should also be noted that this invention could be designed into any call processing system which contains the capability, at network nodes, to establish circuit switched calls based on dialed digits, to detect dial tone and voice via tone detection hardware and software and to transmit DTMF information, and the capability at the gateway network node to terminate circuit switched calls and wait for and accept DTMF calls.

The tone detection hardware and software at the network node requires the network node to know when a call is answered. However rather than using tone detection hardware and/or software, the network node and gateway node could enter into a DTMF hand-shaking protocol when the call is established. In this case the network node connects a DTMF receiver to the circuit switched path it had established. Once the gateway node answered the call, it would then transmit special DTMF digits to the calling network node. The network node would receive the DTMF digits and thus know that a network call path had been established. It could then signal the DTMF information that it wished to convey.

While the above detailed description has been directed to the reporting of alarms, it will be recognized that it could be used in any environment that requires that a network node report an event to a gateway network node. Of course the amount of information that can be conveyed is restricted by the number of DTMF digits that could be received in a single call by the gateway network node.

A person understanding this invention may now conceive of alternative structures and embodiments or variations of the above. All of those which fall within the scope of the claims appended hereto are considered to be part of the present invention.

I claim:

1. A method of reporting an event to a monitoring station in a network of communication switching exchanges comprising:

(a) monitoring in each exchange for events to be reported, (b) upon detection of the event, the exchange in which the event occurred automatically dialing a gateway network node to which a network monitoring station is connected, (c) upon the network node responding to the automatic dialing, sending at least one DTMF signal containing a report of the nature of the event and an identification of the exchange in which the event occurred to the network node for provisions to the network monitoring station with an identification of the network node, in which the monitoring step is comprised of comparing the previous condition of each switching exchange in which the event occurred with a current condition of the switching exchange in which the event occurred, and generating an event message containing said report in the event of a difference.

2. A method as defined in claim 1 in which said event is an alarm condition, and in which the detection of the event occurs by monitoring data processed by a processor of each switching exchange.

* * * * *